(No Model.)
W. B. COGSWELL.
FINDER ATTACHMENT FOR CAMERAS.
No. 484,179. Patented Oct. 11, 1892.
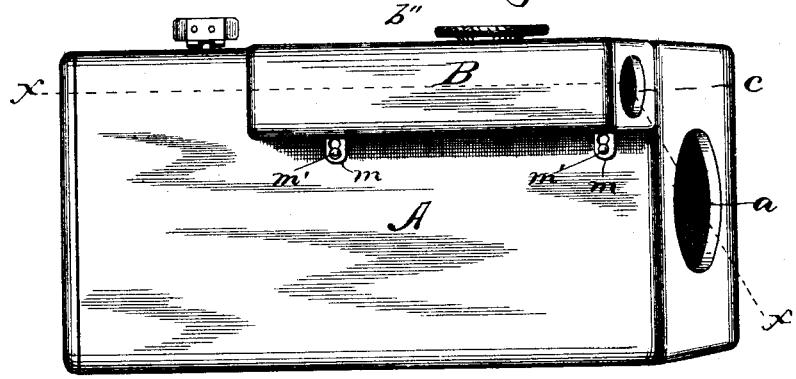
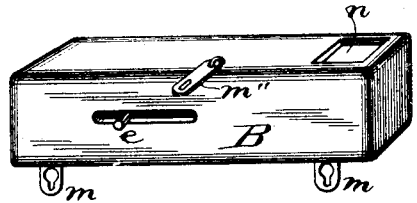
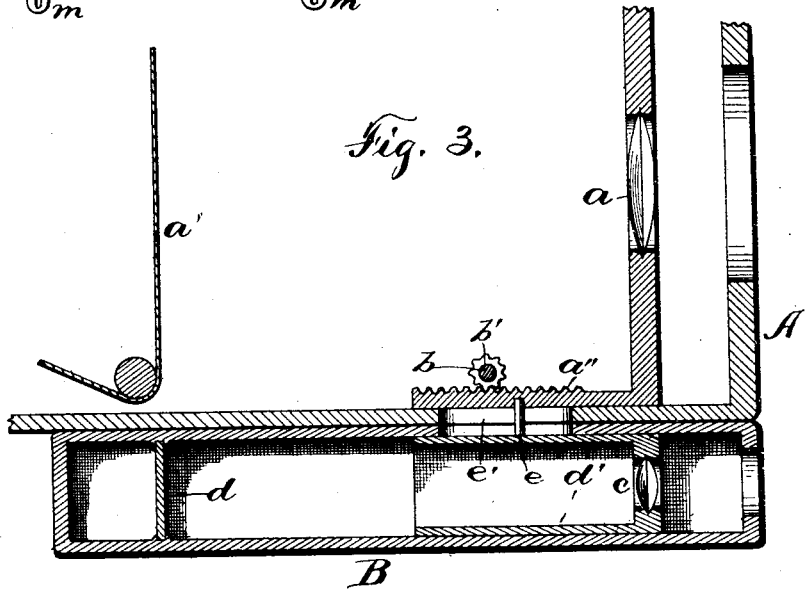
WITNESSES:
H. A. Carhart
Geo. K. Blowers
INVENTOR,
William B. Cogswell
BY
Smith & Denison
his ATTORNEYS
THE NORRIS PETERS CO., PHOTO-LITHO., WASHINGTON, D. C.

UNITED STATES PATENT OFFICE.

WILLIAM B. COGSWELL, OF SYRACUSE, NEW YORK.

FINDER ATTACHMENT FOR CAMERAS.

SPECIFICATION forming part of Letters Patent No. 484,179, dated October 11, 1892.

Application filed May 7, 1892. Serial No. 432,108. (No model.)

*To all whom it may concern:*

Be it known that I, WILLIAM B. COGSWELL, of Syracuse, in the county of Onondaga, in the State of New York, have invented new and useful Improvements in Cameras, of which the following, taken in connection with the accompanying drawings, is a full, clear, and exact description.

My invention relates to photographic cameras, and particularly to range-finding attachments thereto.

My object is to provide a camera with an auxiliary range-finder to be detachably connected to or mounted in any manner in or upon the body of the camera in such manner as not to interfere with the main screen and the adjustable main lens, and comprising an auxiliary screen and an auxiliary adjustable lens of smaller size than the main lens, but of the same focus and adjustable simultaneously with the main lens, all suitably inclosed, and by which the range is accurately determined by the auxiliary lens and its adjustment, all being so arranged that the adjustment of both lenses is simultaneous and alike, so that the main lens is always at the same focal distance from the main screen, plate, or film that the other screen is from its lens, and the range is formed and determined accurately by viewing the auxiliary screen through a suitable aperture and without necessarily viewing the main screen.

My invention consists in the several novel features of construction and operation hereinafter described, and which are specifically set forth in the claim hereto annexed.

It is constructed as follows, reference being had to the accompanying drawings, in which—

Figure 1 is a perspective view of a camera having my range-finder mounted upon the top thereof. Fig. 2 is a perspective view of the range-finder detached and reversed end for end from the position shown in Fig. 1. Fig. 3 is a transverse longitudinal section on line $x\ x$ in Fig. 1.

The post lettered A on the drawings represents a camera-box of any ordinary construction provided with an adjustable lens $a$ and a main screen, plate, or film $a'$, said lens being mounted upon a rack-bar $a''$ and operated by a pinion $b$, engaging with the rack, as shown, said pinion being rotated by the shaft $b'$, which projects through the camera-case and is provided with a finger-button $b''$. All of this is of ordinary construction.

B is the range-finder, shown as comprising a case, an auxiliary and adjustable lens $c$ of the same focus as the main lens, mounted in a slide $d'$, a screen $d$, a pin $e$ upon said slide and projecting through a slot way $e'$ in the camera-case, and also in the finder-case, and detachably engaging with the rack-bar $a''$. The range-finder is shown as having ears $m$, adapted to engage with buttons $m'$ upon the camera, and with a hasp $m''$, by which it is detachably connected to the camera. The range-finder is also provided with an aperture $n$, through which the screen $d$ may be viewed in the ordinary manner.

It will be readily seen that as the lenses are of the same focus and as the screens or screen, plate, or film are always at an equal distance from the lenses the range of the camera can always be accurately found by adjusting both lenses simultaneously, but only viewing the auxiliary or lesser screen. The latter may be of any size desired, and may show the whole or only part of the field of the camera; but the range of the whole can be determined accurately from a part as well as from the whole field.

What I claim as my invention, and desire to secure by Letters Patent, is—

The combination, with a camera provided with a screen and a lens adjustable with reference to the screen and mounted upon a sliding frame, of a range-finder consisting of a separate case detachably connected to the body of the camera and provided with a screen and a lens adjustable with reference to the screen, mounted in a sliding frame within the finder-case, and means to simultaneously and equally reciprocate the frame of the camera-lens and the frame of the finder-lens, both lenses being of equal focus and always at the same focal distance from their respective screens, the frame of the finder-lens being detachably connected to the other frame through a slot in the side of the finder-case, said finder being also provided with a viewing-aperture.

In witness whereof I have hereunto set my hand this 2d day of May, 1892.

W. B. COGSWELL.

In presence of—
  C. W. SMITH,
  HOWARD P. DENISON.